United States Patent [19]

Murray

[11] Patent Number: 5,119,242
[45] Date of Patent: Jun. 2, 1992

[54] APPARATUS AND METHOD FOR SYNCHRONIZIG AUDIO AND VIDEO TAPE PLAYERS

[75] Inventor: William J. Murray, Andover, England

[73] Assignee: Sony Corporation, Tokyo, Japan

[21] Appl. No.: 469,370

[22] Filed: Jan. 24, 1990

[30] Foreign Application Priority Data

Feb. 28, 1989 [GB] United Kingdom ............... 8904509

[51] Int. Cl.$^5$ .................... G11B 27/02; G11B 15/46
[52] U.S. Cl. .................................. 360/14.2; 360/73.02
[58] Field of Search ............. 360/14.1, 14.2, 14.3, 360/69, 70, 73.02, 73.04, 73.09, 73.12

[56] References Cited

U.S. PATENT DOCUMENTS 4,554,602  11/1985  Tobe .............................. 360/14.2
4,862,411  8/1989  Dishon et al. ................. 360/73.03 X Primary Examiner—Andrew L. Sniezek
Attorney, Agent, or Firm—Alvin Sinderbrand; William S. Frommer

[57] ABSTRACT

In synchronizing audio and video tape players each reproducing a tape having recorded thereon a time code signal comprising digital words each containing data identifying a video frame, the time code signals are detected and frame pulse signals recovered from them are applied to a PLL (phase locked loop) controlling the speed of one of the players whereby the two players are synchronized by phase locking between the frame pulse signals such that the time code signals have a desired mutual temporal relationship. In the event of failure to detect at least one of the time code signals, the one player is driven at a fixed speed. On resumption of detection of both time code signals after such a failure, synchronization of the players is reestablished as follows. The drive of the one player at the fixed speed is stopped. Further pulse signals derived from the time code signals are applied to the PLL (pulse locked loop) which establishes phase locking between them. One or the other of the further pulse signals is then repeatedly inverted whereby the PLL (phase locked loop) repeatedly establishes phase locking between them, each time with a 180° step in their phase relationship. When the repeated inversion has stepped the phase relationship of the further pulse signals such that the frame pulse signals are in synchronization and the time code signals have the desired temporal relationship, the frame pulse signals are again used for synchronization.

4 Claims, 3 Drawing Sheets

APPARATUS AND METHOD FOR SYNCHRONIZIG AUDIO AND VIDEO TAPE PLAYERS

BACKGROUND OF THE INVENTION

1. Field of the Invention

This invention relates to synchronizing audio and video tape players.

2. Description of the Prior Art

There are various applications where professional video equipment users, such as video production companies and/or broadcasters, may wish to synchronize audio and video tape players, for example to mix audio and video together in synchronism on a new tape or to broadcast the audio and video together in synchronism. Examples of such applications are in post-production, where video and audio may be recorded at different times and have to be brought together, or for bringing in special effects recorded on a library tape. Another example is where it is desired to transmit programs in several languages and the video tape does not have enough tracks for all of the languages, whereby there is a need to play an audio tape in parallel with the video tape.

It is known to facilitate such synchronization of audio and video tape players by the use of time code signals that are recorded, for example on so-called time code tracks, on the tapes played by the audio and video tape players. The time code signal comprises a sequence of 30 digital words, each of which identifies a respective video frame. That is, each video frame on the video tape, or each portion of a sound track on the audio tape to be associated with a video frame, is identified by a time code. To achieve synchronization of the tapes on playback, the time codes are used to position the tapes in a desired temporal relationship and frame pulse signals derived from the time codes are then locked together to maintain synchronism between the tapes.

The foregoing will now be explained in more detail with reference to FIG. 1 of the accompanying drawings, which shows a previously proposed apparatus for synchronizing audio and video tape players. The apparatus shown in FIG. 1 comprises a video tape recorder (VTR) 10 and an audio tape recorder (ATR) 12. (For the avoidance of confusion, it should be noted that, although the items 10 and 12 are recorders, they are used only as players in the present application. It should further be noted that, although the item 12 is described as being an ATR, it may in fact be a VTR and the tape played thereby may be a video tape also having audio information recorded thereon, though in the present application only the audio information is needed.)

The VTR 10 and ATR 12 produce video and audio output signals, respectively, these signals not being shown in FIG. 1. These signals may, for example, be mixed together and recorded on another tape and/or broadcast simultaneously, as explained above.

The tapes played on the VTR 10 and ATR 12 include time code signals which are outputted via lines 14 and 16, respectively, to respective time code readers (TCRs) 18 and 20, respectively. Each time code signal comprises a sequence of digital words each identifying an associated video frame. As shown in FIG. 2 of the accompanying drawings, each word of the time code signal has a length of 80 bits. The 80 bits comprise 32 bits which indicate time (in hours, minutes and seconds on a 24 hour clock basis) and the frame number, 32 bits which the user can employ for various purposes, and 16 synchronization bits. Rather than being, as shown, arranged in sequence, the bits of the two groups of 32 bits are in fact interleaved. The detailed format of the bits is known in the art and full details can be obtained from relevant standards published by the SMPTE (Society of Motion Picture and Television Engineers) and the EBU (European Broadcasting Union).

The TCRs 18, 20 may be proprietary integrated circuits, for example CX 7912A integrated circuits marketed by Sony Corporation. In a manner known per se, each TCR 18, 20 decodes each word of the time code signal to produce information representing the time and frame number on lines 22, 24, respectively, which information can, for example, be viewed. Also in a manner known per se, each TCR 18, 20 produces on a line 26, 28, respectively, a frame pulse signal shown in FIG. 3 of the accompanying drawings. As shown in FIG. 3, each frame pulse signal is a square wave having a period equal to the frame period, namely (for example) 40 ms in a 25 frame per second system. Further, and again in a manner known per se, the TCRs 18, 20 recover from the time code signals, as well as the frame pulse signals, data clock pulse signals which are used internally of the TCRs to decode the data contained in the words of the time code signals. The frequency of the data clock pulse signals is 80 times that of the frame pulse signals, being that of the bits making up each word of the time code signal. The data clock pulses generated and utilized internally of the TCRs 18, 20 are made available to the exterior of the TCRs. More specifically, as shown, a video data clock pulse signal VDCLK is made available on a line 29 and an audio data clock signal ADCLK is made available on a line 30, the lines 29, 30 being connected to respective inputs of a dropout detector 31. The signals VDCLK and ADCLK are of the same form and are both as shown in FIG. 5 of the accompanying drawings at (A).

The lines 26, 28 carrying the video and audio frame pulse signals, respectively, are connected to respective inputs of a phase detector 32. An error signal produced on an output of the phase detector 32 is connected via a low pass filter 33 and a switch 34 to a line 35 connected to an input of the ATR 12 that controls the reproduction speed of the ATR 12 in accordance with the level of the signal applied to such input.

An output of a fixed drive 36 is connected to the switch 34. The switch 34 is controlled by a control microprocessor 37 whereby a fixed level from the fixed drive 36 can be applied to the ATR 12, in place of the filtered error signal, by changing over the switch from the illustrated condition.

A dropout detect signal from the dropout monitor 31 is connected by a line 38 to the phase detector 32 and to the microprocessor 37.

The apparatus shown in FIG. 1 operates in the following manner. The VTR 10 and ATR 12 are required to reproduce or play respective tapes such that there is a desired temporal relationship between the video and audio material recorded on the respective tapes, that is to say such that there is a desired difference (which in some cases might be zero) in terms of hours, minutes, seconds and frame number between the information being reproduced by the VTR 10 and ATR 12 at any one time. Such relationship is initially established by running one or both of the VTR 10 and ATR 12 until, for example by viewing the time and frame numbers represented by the information on the lines 22, 24, the two tapes are within one frame of the desired temporal relationship. During this initial setting up, the locking together or synchronization (described below) of the two tapes will be inhibited. Once the temporal relationship has been established to the nearest frame, the exact temporal relationship is achieved and thereafter maintained by the circuit of FIG. 1 as will now be described.

When the switch 34 is in the illustrated condition, the phase detector 32, ATR 12 and TCR 20 form a phase locked loop (PLL) that controls the speed of reproduction of the ATR 12 to conform with that of the VTR 10. Thus, the phase detector 32 detects the leading edges of the video and audio frame pulse signals applied thereto on the lines 26 and 28, respectively, and, in response to any difference in the timing thereof, produces the above-mentioned error signal which acts on the loop to control the speed of the ATR 12 until the leading edges of the two frame signals are brought into synchronization. Thereafter, the PLL acts indefinitely to adjust the speed of the ATR 12 as necessary to keep the leading edges of the two frame pulse signals in synchronization whereby the audio and video are reproduced in synchronism.

During the operation of the apparatus of FIG. 1, a problem will arise if, for example due to poor recording, one or both of the time code signals should be lost. Consider, for example, what happens if the video time code signal (and therefore the video frame pulse signal) disappears. In the absence of any measure to the contrary, the PLL will assume that the VTR has stopped and will therefore act to stop the ATR 12. Naturally, this is not desired, since the VTR 10 is still in fact running. The dropout monitor 31 prevents this happening. The dropout monitor 31 monitors for the presence of both time code signals (indirectly so, by monitoring for the presence of the data clock pulse signals VDCLK and ADCLK) and is responsive to either or both of these signals disappearing to produce the dropout detect signal on the line 38. This gives rise to the following. Firstly, the phase detector 32 is inhibited by the dropout detect signal, which "freezes" the drive to the ATR 12. Secondly, the microprocessor 37 is responsive to the dropout detect signal to change over the switch 34. This breaks the PLL and causes the fixed level from the fixed drive 36 to be applied to the ATR 12 (instead of the filtered error signal) via the line 35 to cause the ATR to continue running at a fixed, nominal speed. While this prevents the ATR 12 being stopped in the event of either of the frame pulse signals disappearing, the ATR is not being synchronized while both frame pulse signals are not present and will gradually drift out of synchronization with the VTR 10, a drift of around one frame per minute being typical. This leads to the following problem. When the disappearance of the one or more frame pulse signals ends, the dropout detect signal produced by the dropout monitor 31 disappears, as a result of which the phase detector 32 is reenabled and the microprocessor 37 changes over the switch 34 so that it readopts its illustrated condition. Thus, the PLL comes back into operation. When it does so, it restores synchronization abruptly. Thus, if the accumulated drift or error is a significant proportion of a frame, the relocking operation will be clearly audible: there will be an abrupt pitch change until the frame pulse signals are again phase locked together.

An object of the invention is to provide a synchronizing method and apparatus of the above general kind in which the relocking operation after loss of one or both of the time code signals is less abrupt and therefore less noticeable.

SUMMARY OF THE INVENTION

The present invention provides a method of synchronizing audio and video tape players, each reproducing a tape that has recorded thereon a time code signal comprising a sequence of digital words each comprising data identifying a video frame, which comprises the following steps.

1. The time code signals recorded on the tapes are detected and a frame pulse signal is recovered from each time code signal.

2. The recovered frame pulse signals are applied to a phase detector that forms part of a phase locked loop (PLL) controlling the reproduction speed of one of the players whereby the reproduction speed of that one player is synchronized with that of the other player by phase locking between the frame pulse signals such that the two time code signals have a desired temporal relationship with one another.

3. A further pulse signal of higher frequency than the frame pulse signal is derived from each time code signal.

4. In the event of failure to detect at least one of the time code signals, said one player is driven at a fixed reproduction speed; and in the event of resumption of detection of both time code signals after failure to detect one of them, synchronization of the players is reestablished by:

(i) terminating the driving of said one player at the fixed reproduction speed;

(ii) applying the further pulse signals to the phase detector whereby the phase locked loop establishes phase locking between the further pulse signals;

(iii) repeatedly inverting one of the further pulse signals whereby the phase locked loop repeatedly reestablishes phase locking between the further pulse signals, each time with a 180° step in their phase relationship; and (iv) when the operation of repeated inversion has resulted in stepping of the phase relationship of the further pulse signals to the extent that the two frame pulse signals are in synchronization and the two time code signals have the desired temporal relationship with one another, reverting to applying the frame pulse signals, rather than the further pulse signals, to the phase detector.

The invention also provides apparatus for synchronizing audio and video tape players each capable of reproducing a tape that has recorded thereon a time code signal comprising a sequence of digital words each comprising data identifying a video frame. The apparatus comprises the following items.

A. Means for detecting the time code signals recorded on the tapes and recovering a frame pulse signal from each time code signal.

B. A phase locked loop (PLL), including a phase detector, for controlling the reproduction speed of one of the players.

C. Switch means capable of selectively applying the recovered frame pulse signals to the phase detector whereby the reproduction speed of said one player is synchronized with that of the other player by phase locking of the frame pulse signals such that the two time code signals have a desired temporal relationship with one another.

D. Means for deriving from each time code signal a further pulse signal of higher frequency than the frame pulse signal, the switch means being capable of supplying the further pulse signals to the phase detector instead of the frame pulse signals.

E. Inverting means for inverting the further pulse signals.

F. Means responsive to failure to detect at least one of the time code signals to drive said one player at a fixed reproduction speed.

G. Control means operative, in the event of resumption of detection of both time code signals after failure to detect one of them, to reestablish synchronization of the players by:

(i) terminating the driving of said one player at the fixed reproduction speed;

(ii) causing the switch means to apply the further pulse signals to the phase detector whereby the phase locked loop establishes phase locking between the further pulse signals;

(iii) causing the inverting means repeatedly to invert one of the further pulse signals whereby the phase locked loop repeatedly reestablishes phase locking between the further pulse signals, each time with a 180° step in their phase relationship; and (iv) when the operation of repeated inversion has resulted in stepping of the phase relationship of the further pulse signals to the extent that the two frame pulse signals are in synchronization and the two time code signals have the desired temporal relationship with one another, causing the switch means to revert to applying the frame pulse signals, rather than the further pulse signals, to the phase detector.

The present invention thus enables relocking, after temporary loss of one or more of the frame pulse signals, to be achieved in a gradual stepwise manner, thereby making the relocking operation less noticeable.

BRIEF DESCRIPTION OF THE DRAWINGS

The above and other objects, features and advantages of the invention will be apparent from the following detailed description of an illustrative and preferred embodiment which is to be read in conjunction with the accompanying drawings, in which like references designate like items throughout, and in which.

DESCRIPTION OF THE PREFERRED EMBODIMENT

Figure 4:
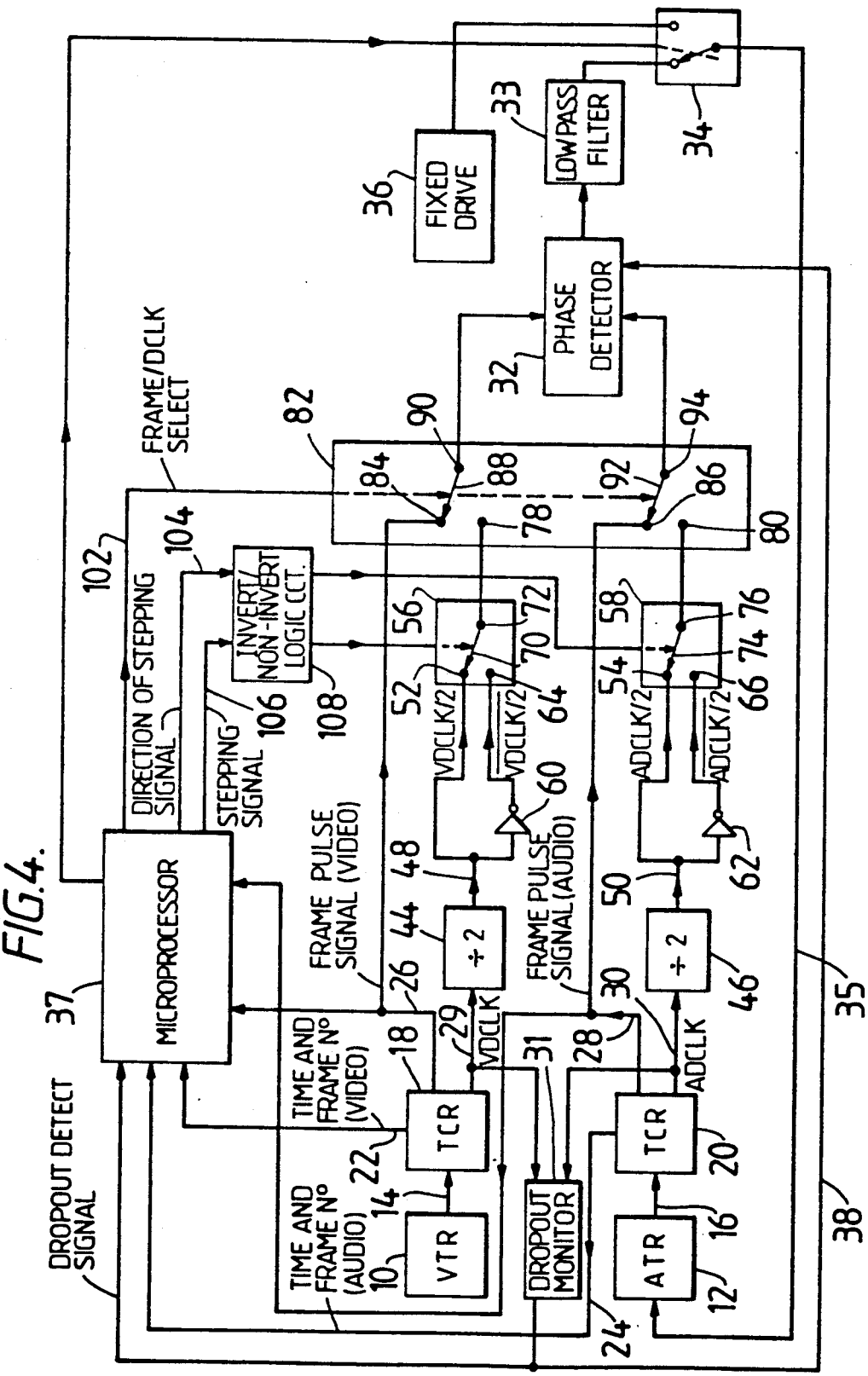
FIG. 4 shows apparatus for synchronizing audio and video tape players according to the present invention.

FIG. 4 shows apparatus embodying the invention for synchronizing audio and video tape players. The apparatus is in several respects similar to that shown in FIG. 1 and will be described only in so far as it differs therefrom. In FIG. 4, references that are the same as references used in FIG. 1 indicate like items.

Figure 5:
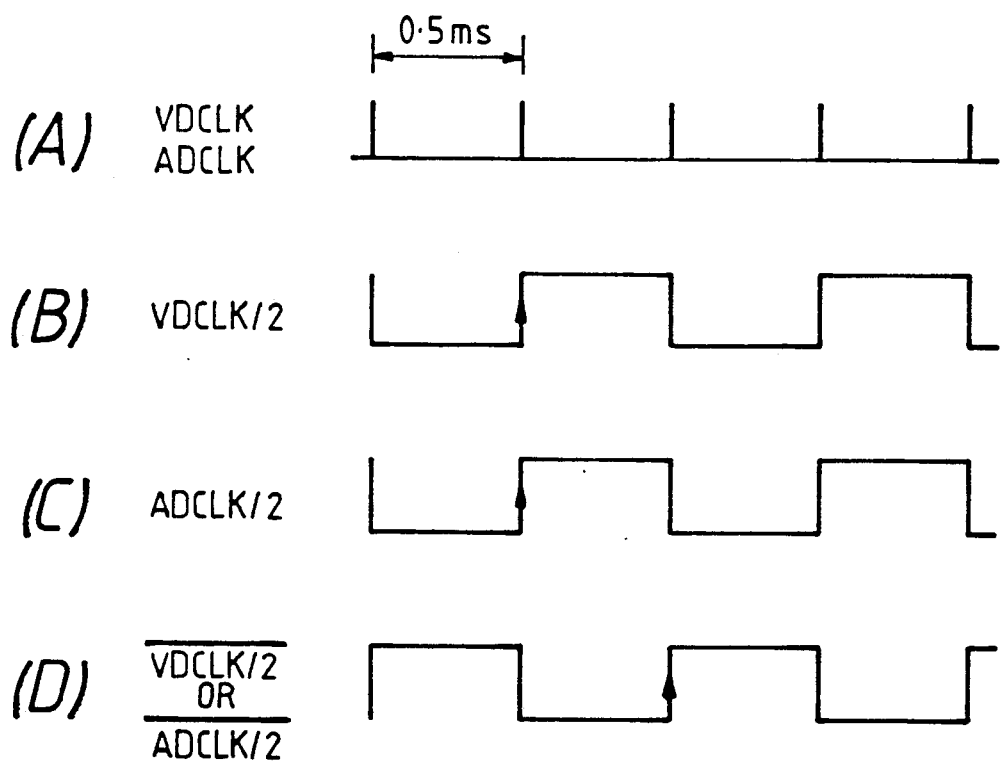
FIG. 5 (A-D) shows various signal waveforms present in the apparatus of FIG. 4.

In the apparatus of FIG. 4, the data clock pulse signals VDCLK and ADCLK (shown in FIG. 5 at (A)) on the lines 29, 30, respectively, are applied to respective divide-by-two circuits 44, 46, whereby square waves VDCLK/2 and ADCLK/2, shown in FIG. 5 at (B) and (C), respectively, are derived on lines 48, 50, respectively. Since the data clock pulses VDCLK and ADCLK have a period of 0.5 ms, namely 1/80 of that of the frame pulse signal, the signals VDCLK/2 and ADCLK/2 have periods of 1.0 ms.

The signals VDCLK/2 and ADCLK/2 on the lines 48, 50 are passed to terminals 52, 54 of switches 56, 58, respectively; and are fed to respective inverters 60, 62 whereby signals $\overline{VDCLK/2}$ and $\overline{ADCLK/2}$ appear on terminals 64, 66, respectively, of the switches 56, 58.

The switch 56 has a movable contact 70 which can connect a terminal 72 thereof to either of the terminals 52 and 64. The switch 58 has a movable contact 74 which can connect a terminal 76 thereof to either of the contacts 54 and 66.

The terminals 72, 76 of the switches 56, 58 are connected to terminals 78, 80 of a further switch 82. The switch 82 has further terminals 84, 86 which are connected to the lines 26, 28 to receive the video and audio frame pulse signals, respectively. The switch 82 has a movable contact 88 which can connect a terminal 90 thereof to either of the terminals 84 and 78. Also, the switch 82 has a movable contact 92 which can connect a terminal 94 thereof to either of the contacts 86 and 80. The terminals 90 and 94 of the switch 82 are connected to the respective inputs of the phase detector 32.

The control microprocessor 37 is connected to the lines 22, 24, 26 and 28 to receive the video and audio frame pulse signals and the time and frame number information, all provided by the TCRs 18 and 20.

The microprocessor 37 has a frame/DCLK select line 102 which controls the movable contacts 88 and 92 of the switch 82 so that they are either in the positions illustrated in FIG. 4, in which (as in FIG. 1) the video and audio frame pulse signals are applied to the respective inputs of the phase detector 30, or in the alternative positions (linking the terminals 78, 90 and 80, 94) in which, as explained below, the signals VDCLK/2 or $\overline{VDCLK/2}$ and ADCLK/2 or $\overline{ADCLK/2}$ are supplied to the respective inputs of the phase detector 32.

The microprocessor 37 additionally produces a direction of stepping signal on a line 104 and a stepping signal on a line 106, both of which signals are applied to an invert/non-invert logic circuit 108. Outputs of the logic circuit 108 control the movable contacts 70, 74 of the switches 56, 58 whereby either the signal VDCLK/2 or the signal $\overline{VDCLK/2}$ is supplied to the terminal 78 of the switch 82 and either the signal ADCLK/2 or the signal $\overline{ADCLK/2}$ is supplied to the terminal 80 of the switch 82.

Although, in FIG. 4, the switches 56, 58 and 82 are shown for clarity as mechanical switches, it will be appreciated that, in practice, they will more probably be embodied as electronic circuits. (The same applies to the switch 34 shown in both FIGS. 1 and 4).

The apparatus shown in FIG. 4 operates in the following manner. The VTR 10 and ATR 12 are first brought to within one frame of their desired temporal relationship, as described above with reference to FIG. 1, the normal operation of the apparatus of FIG. 4 (as described below) being overridden during this operation. This can in fact be accomplished by providing the microprocessor 37 with a routine which, on entry therein of a desired temporal spacing (in terms of hours, minutes, seconds and frame numbers) between the two tapes, will drive one or the other of the VTR 10 and ATR 12 until they are within one frame of the desired relationship.

Normal operation of the apparatus of FIG. 4 then commences. During normal operation, the signal on the line 102 from the microprocessor 37 is such that the movable contacts 88, 92 of the switch 82 are in the illustrated positions, whereby the lines 26, 28 bearing the video and audio frame pulse signals, respectively, from the TCRs 18, 20 respectively, are connected to the respective inputs of the phase detector 32. In this normal operating condition, no signals are produced on the lines 104, 106.

Figures 1, 2, 3:
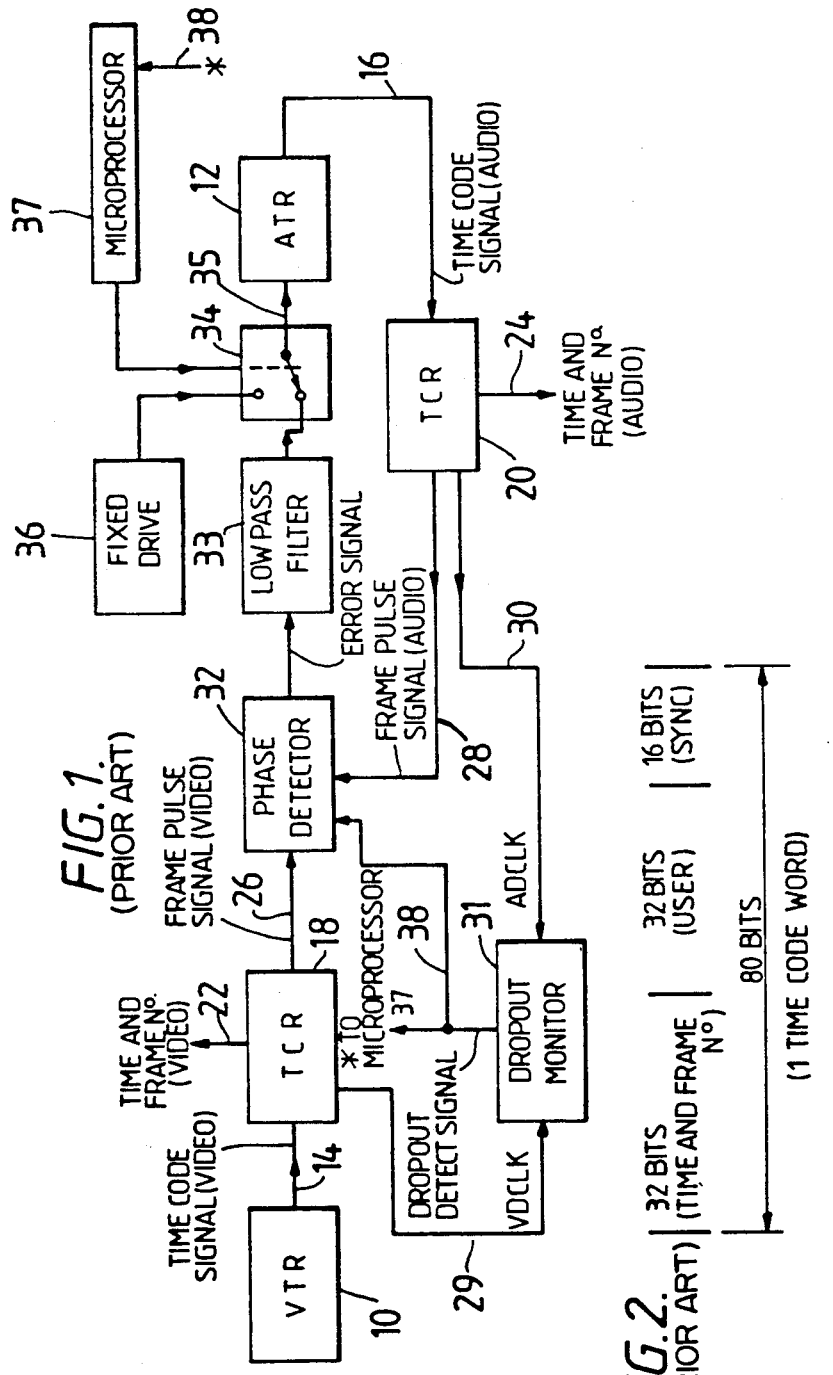
FIG. 1 is a block schematic circuit diagram of a apparatus for synchronizing audio and video tape players in accordance with the prior art.
FIG. 2 shows schematically one word of a digital time code signal recorded on tapes being played by video and audio tape players of the apparatus of FIG. 1.
FIG. 3 shows a frame pulse signal derived from each of the time code signals in the apparatus of FIG. 1.

In normal operation, the apparatus of FIG. 4 operates in exactly the same way as that of FIG. 1. That is to say, the phase locked loop (PLL) constituted by the phase detector 32, ATR 12 and TCR 20 acts to keep the leading edges of the frame pulse signals in synchronization.

Should either or both of the frame pulse signals disappear, for example due to a recording defect, the apparatus of FIG. 4 again operates in the same manner as that of FIG. 1. That is to say, the dropout monitor 31 is responsive to the disappearance of one or both of the data clock pulse signals VDCLK, ADCLK to produce the dropout detect signal which is applied through a line 38 to phase detector 32 and microprocessor 37, as results of which the phase detector 32 is inhibited to freeze the drive to the ATR 12 and the microprocessor 37 changes over the switch 34 from the illustrated position so that the fixed level drive signal is applied via the line 35 to the ATR 12 whereby the ATR 12 is driven at a fixed nominal speed.

The apparatus of FIG. 4 differs from that of FIG. 1, as will now be described, in the way in which it reestablishes locking of the audio and video signals, with the correct desired relative temporal relationship, when, after the temporary loss of one or both of them, both frame pulse signals are again present.

When the microprocessor 37 detects that both the frame pulse signals are again present, the driving of the ATR 12 at a fixed normal speed is interrupted and the microprocessor 37 looks at the time and frame number information as presented on the lines 22 and 24 from the TCRs 18, 20 to determine by how much, and in what sense, the difference therebetween differs from the desired temporal relationship. That is to say, it determines the amount and sense of the drift or error that has occurred. It then initiates a procedure to correct for the drift on a stepwise gradual basis. This procedure may be initiated automatically by the microprocessor 37 when the dropout detect signal disappears or only after an operator command to commence initiation has been inputted to the microprocessor. In the former case, the phase detector 32 can, as before, be reenabled directly by the dropout monitor 31 when the dropout signal disappears. In the latter case, the operator command may be fed also to the phase detector 32, to reenable its operation, or the microprocessor 37 may be responsive to the operator command to reenable the operation of the phase detector 32.

The microprocessor 37 issues a command, indicative of the direction or sense of stepping needed to achieve resynchronization, on the line 104. If the command indicates that stepping should take place in a first direction, the invert/non-invert logic circuit 108 will be operative to change over the switch 56 each time a stepping signal is received on the line 106 from the microprocessor, the switch 58 remaining in the illustrated position. If, on the other hand, the command on the line 104 indicates that stepping should take place in the opposite direction, the circuit 108 leaves the switch 56 in the illustrated position and, instead, changes over the switch 58 each time a stepping signal is received on the line 106.

At the start of the relocking procedure, the microprocessor 37 changes the signal on the frame/DCLK select line 102 so that the switch 82 changes over from the illustrated position. Thus, the switches 56, 58 at that time being in the illustrated position, the signals VDCLK/2 and ADCLK/2 are applied via the switches 56, 58 and 82 to the respective inputs of the phase detector 32. Thus, the phase locked loop (PLL) establishes phase locking between the signals VDCLK/2 and ADCLK/2 by bringing leading edges of the two signals into temporal coincidence. Since the maximum shift necessary to achieve this is 0.5 ms, namely one half of the period of the signals, the small change involved (1/80 of a frame) is barely audibly discernable. Then, stepping signals are applied repeatedly on the line 106 to the invert/non-invert logic circuit 108. Each time a stepping signal is applied to the line 106, either the switch 56 or the switch 58 (depending upon the direction of stepping) is changed over. If, for example, the switch 56 is changed over, the signal applied to one input of the phase detector 32 will change from VDCLK/2 to $\overline{\text{VDCLK/2}}$. Prior to the changeover, two leading edges of the signals VDCLK/2 and ADCLK/2, namely those designated by arrows in FIG. 5(B) and (C), will have been locked together. Changing over the switch 56 has the effect of inverting the signal VDCLK/2 applied to the phase detector 30 to the signal $\overline{\text{VDCLK/2}}$; that is, of changing the phase of the signal by 180°. The effect of this will be that the PLL will relock such that the edge of the signal ADCLK/2 shown in FIG. 5(C) by an arrow will be locked with the edge of the signal $\overline{\text{VDCLK/2}}$ shown in FIG. 5(D) by an arrow. This instantaneous 180° change in phase of the signal applied to one input of the phase detector 32, causing the PLL to lock on the following edge, involves a change in phase of only 0.5 ms (1/80 of a frame) and will again barely be discernable.

The foregoing process is repeated step by step, each time a stepping signal is applied to the line 106, until the VTR 10 and ATR 12 are again back in frame synchronization with the desired temporal relationship. The frequency of the stepping signals applied to the line 106 is kept sufficiently low, say one per second, that the repeated very slight audible changes will not tend to be conspicuous by being closely adjacent to one another.

The process of reestablishing frame synchronization may involve correcting a drift of more or less than one frame. Since the microprocessor 37 can readily compute, as described above, the extent of drift that has occurred, whether the drift is of more or less than one frame makes no difference.

When the stepping at the data clock rate has progressed to such an extent that the frame pulse signals again have coincident leading edges and the desired temporal relationship has been achieved, the microprocessor 37 switches over the signal on the frame/DCLK select line 102 whereby the switch 82 is caused to again connect the frame pulse signals to the respective inputs of the phase detector 32 whereby the apparatus reverts to its normal mode of operation in which the PLL effects phase locking between the video and audio frame pulse signals.

In FIG. 4, the positioning of the VTR and ATR can be interchanged.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of synchronizing audio and video tape players reproducing respective tapes that have recorded thereon time code signals each comprising a sequence of digital words each containing data identifying a respective video frame, the method comprising:
   detecting said time code signals recorded on the tapes and recovering a frame pulse signal from each of said time code signals;
   detecting phase differences between the recovered frame pulse signals and normally controlling the reproduction speed of a predetermined one of said players in accordance with the detected phase differences whereby the reproduction speed of said predetermined player is synchronized with the reproduction speed of the other player by phase locking said frame pulse signals such that the two time code signals have a desired temporal relationship with one another;
   deriving from said time code signals further pulse signals of higher frequency than the frame pulse signals;
   driving said predetermined player at a fixed reproduction speed if time code signals recorded on at least one of said tapes are not detected; and
   reestablishing synchronization of said players when time code signals recorded on both of said tapes are detected once again by:
   terminating the driving of said predetermined player at said fixed reproduction speed;
   detecting phase differences between said further pulse signals and phase locking said further pulse signals;
   repeatedly inverting at a selected rate one of said further pulse signals to phase lock the inverted further pulse signal with the further pulse signal which has not been inverted; and
   reverting to detecting phase differences between said frame pulse signals, rather than said further pulse signals when the phase locking of the repeatedly inverted further pulse signal to the non-inverted further pulse signal has resulted in substantial synchronization of the two frame pulse signals and desired temporal relationship of the two time code signals.

2. A method according to claim 1, wherein each of said further pulse signals is derived by:
   recovering from the respective time code signal a data clock pulse signal which is used to decode the data of the time code signal; and
   dividing said data clock pulse signal by two to produce said further pulse signal as a square wave signal.

3. Apparatus for synchronizing audio and video tape players reproducing respective tapes that have recorded thereon time code signals each comprising a sequence of digital words each containing data identifying a respective video frame, the apparatus comprising:
   detecting means for detecting said time code signals recorded on the tapes and recovering a frame pulse signal from each of said time code signals;
   a phase locked loop, including a phase detector, for controlling the reproduction speed of a predetermined one of said players;
   switch means for applying the recovered frame pulse signals to said phase detector whereby the reproduction speed of said predetermined player is synchronized with the reproduction speed of the other player by phase locking between said frame pulse signals such that the time code signals recorded on the tapes have a desired temporal relationship with one another;
   means for deriving from each said time code signal a further pulse signal of higher frequency than the frame pulse signal;
   means responsive to said detecting means for driving said predetermined player at a fixed reproduction speed if time code signals recorded on at least one of said tapes are not detected; and
   control means responsive to said detecting means to reestablish synchronization of said players when time code signals recorded on both of said tapes are detected once again,
   said control means including means for terminating said driving of said predetermined player at said fixed reproduction speed;
   means for actuating said switch means to apply said further pulse signals to said phase detector in place of said frame pulse signals, whereby said phase locked loop establishes phase locking between said further pulse signals;
   inverting means for repeatedly inverting at a selected rate one of said further pulse signals applied to said phase detector, whereby said phase locked loop repeatedly reestablishes phase locking between the inverted further pulse signal and the further pulse signal which is not inverted; and
   means for causing said switch means to revert to applying said frame pulse signals, rather than said further pulse signals, to said phase detector when the phase locking of the repeatedly inverted further pulse signal to the non-inverted further pulse signal has resulted in substantial synchronization of the frame pulse signals and desired temporal relationship of the time code signals.

4. Apparatus according to claim 3, wherein said means for deriving said further pulse signals includes:
   means for recovering from the respective time code signal a data clock pulse signal which is used to decode the data of the time code signal; and
   means for dividing said data clock pulse signal by two to produce said further pulse signal as a square wave signal.

* * * * *